(12) United States Patent
Waldrop

(10) Patent No.: US 6,391,950 B1
(45) Date of Patent: May 21, 2002

(54) MABS-BASED PVC PIPE CEMENT

(75) Inventor: Mark Waldrop, Royal Oak, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 08/942,054

(22) Filed: Oct. 1, 1997

(51) Int. Cl.$^7$ ................................................. C08K 5/34

(52) U.S. Cl. ..................... 524/104; 156/308.6; 156/3.4; 156/331.6; 285/285.1; 285/288.1; 285/290.1; 525/84

(58) Field of Search .............................. 156/308.6, 314, 156/331.6; 525/84; 524/104; 285/285.1, 288.1, 290.1

(56) References Cited

U.S. PATENT DOCUMENTS 3,473,833 A * 10/1969 Bremer .................... 285/285.1
4,942,201 A *  7/1990 Briggs et al. ................ 525/84
5,252,634 A * 10/1993 Patel et al. ................. 524/104

* cited by examiner

*Primary Examiner*—John J. Gallagher
(74) *Attorney, Agent, or Firm*—Fernando Borrego; Mary K. Cameron

(57) ABSTRACT

Disclosed is a PVC pipe cement composition that comprises a polymeric material of a methyl methacrylate homopolymer or copolymer, a styrene-acrylonitrile polymer, and a rubber grafted with at least a methacrylic acid ester of a $C_1$ to $C_8$ alkanol; and at least about 10% by weight solvent. The pipe cements of the invention form strong welds or bonds and have lower volatile organic content as compared to currently used materials

9 Claims, No Drawings

MABS-BASED PVC PIPE CEMENT

FIELD OF THE INVENTION

The present invention relates to solvent-based cements for bonding joints of polyvinyl chloride (PVC) pipe and fittings. This invention also relates to adhesives or sealants useful for bonding or welding two polymeric surfaces, at least one of which is PVC.

BACKGROUND OF THE INVENTION

Nearly half of the PVC manufactured today is used to form pipes, conduits, and fittings. PVC pipes and fittings are used extensively in the construction industry for both homes and businesses. For example, PVC pipes are used to transport potable water and water for household uses; for drain, waste, and vent (DWV) piping; for outdoor plumbing such as for irrigation and sprinkler systems; for hot tubs, spas, and bathtubs; and for electrical conduits.

Cements, or adhesives, used to form PVC pipe joints must meet both a lap shear bond strength standard and a hydrostatic burst strength standard, both set forth in ASTM D 2564-88, incorporated herein by reference. A strong bond between two pieces, at least one of which is thermoplastic PVC, is obtained by softening the PVC with the solvent in the cement so that the thermoplastic resin at the interface of the pieces to be joined flow together to bond the pieces when they are pressed together. The PVC resin in the cement serves to fill any voids between the pieces, thereby strengthening the bond. Conventional PVC pipe cements consist of from 10 weight percent to about 14 weight percent PVC resin in one or more organic solvents.

In recent years, environmental concerns have prompted efforts aimed toward reducing the volatile organic compounds (VOC) in industrial materials, including plastic pipe cements. Initial efforts typically involved increasing the resin content of the cement. It was discovered, however, that when the amount of PVC was increased from 10 weight percent up to more than about 14 weight percent, the cement displayed the consistency of a gel and was difficult to handle. Further, in order to comply with ASTM D 2564-88 specifications, the cement must be capable of dissolving an additional 3 weight percent of PVC resin without gelation. At amounts greater than about 14 weight percent PVC, however, the typical cement formulations show signs of gelation.

Alternatively, the art-provides compositions that include inert fillers, for example the hollow ceramic spheres and thixotropic agents such as fumed silica and bentonite clay disclosed by Patel et al., U.S. Pat. No. 5,252,634, and by Bush et al., U.S. Pat. No. 5,416,142, both patents being incorporated herein by reference. The cements contain a resin selected from polyvinyl chloride, chlorinated polyvinyl chloride, and acrylonitrile-butadiene-styrene copolymer. The cements produced according to these patents are relatively expensive because of the cost of the hollow ceramic spheres.

King, Sr. discloses in U.S. Pat. No. 4,788,002 compositions comprising 5- or 6-member lactam rings with a cosolvent selected from mono-alcohols having up to four carbon atoms; lower alkyl esters (up to four carbon atoms) of lower alkanoic acids (also up to four carbon atoms); and PVC or ABS polymer. The cosolvents disclosed by King, Sr. are volatile organic compounds that contribute to the VOC content of the cement.

It would be desirable to formulate a low VOC cement with a polymer that could contribute to the ultimate bond strength of the bond or weld formed by the cement.

SUMMARY OF THE INVENTION

It has now been discovered that a solvent-based cement containing a polymeric material of a rigid methyl methacrylate polymer, a rigid styrene-acrylonitrile polymer, and a flexible copolymer of an alkyl methacrylate grafted onto an unsaturated rubber works exceptionally well in certain bonding applications. Thus, according to the present invention, there is provided a cement composition comprising at least about 10% by weight of a polymeric material of a rigid methyl methacrylate polymer, a rigid styrene-acrylonitrile polymer, and a flexible copolymer of an alkyl methacrylate grafted onto an unsaturated rubber. The grafted rubber is preferably a copolymer of styrene butadiene rubber (SBR) that is grafted with an alkyl methacrylate and, optionally, styrene.

The cement composition of the invention further comprises at least about 10% by weight of a solvent or a mixture of solvents. The cement may optionally contain other thermoplastic resins or polymers, such as polyvinyl chloride, chlorinated polyvinyl chloride, acrylonitrile-butadiene-styrene copolymer, acrylic, polycarbonate, cellulose acetate, polyacrylamide, polyamide, or polystyrene. The invention also provides a method of joining two pieces of thermoplastic material, such as poly(vinyl chloride) piping and fittings, and the product piece having one or more joints formed thereby.

The cement compositions of the invention have reduced volatile organic content as compared to conventional PVC pipe cements, at workable viscosities. Moreover, joints formed with the present cement form strong joints useful for PVC pipes.

DETAILED DESCRIPTION

The cements or adhesives of the invention comprise a polymeric material and one or more organic solvents. The polymeric material of the invention contains a polymer of predominantly methyl methacrylate, a styrene-acrylonitrile copolymer, an unsaturated rubber grafted with an alkyl methacrylate, and, optionally styrene. The cements or adhesives of the invention also comprise one or more solvents and, optionally, one or more additional resins. The solvent is preferably N-methyl pyrrolidone or a mixture of solvents that includes N-methyl pyrrolidone.

The polymeric material of the invention comprises at least about 15 parts by weight, preferably at least about 30 parts by weight, of the polymer of predominantly methyl methacrylate and comprises and up to about 70 parts by weight, preferably up to about 60 parts by weight, of the polymer of predominantly methyl methacrylate. In addition, the polymeric material of the invention comprises at least about 10 parts by weight of the styrene-acrylonitrile copolymer and comprises up to about 50 parts by weight, preferably up to about 40 parts by weight, of the styrene-acrylonitrile copolymer. The polymeric material of the invention also comprises at least about 20 parts by weight, preferably at least about 25 part by weight, of the unsaturated rubber grafted with an alkyl methacrylate and comprises up to about 50 parts by weight, preferably up to about 40 parts by weight of the unsaturated rubber grafted with an alkyl methacrylate. Finally, the polymeric material of the invention optionally comprises styrene. (It will be appreciated that each of the foregoing weight percent limitations, as well as each of the other quantitative limitations provided for the invention that follow, may be employed alone or in combination with other limitations.) The polymeric material preferably comprises a rigid component that is a homopolymer or copolymer of methyl methacrylate, a rigid styrene-acrylonitrile polymer, and a styrene butadiene rubber grafted with methyl methacrylate. Such polymeric materials are commonly referred to as methacrylate acrylonitrile butadiene styrene polymers (MABS).

The preferred copolymer of the invention and its preparation is described in U.S. Pat. No. 4,393,164, incorporated herein by reference. The rigid methyl methacrylate component may be a homopolymer of methyl methacrylate or a copolymer of methyl methacrylate with at least about 0.5 by weight of an alkyl acrylate having from 1 to 8 carbon atoms in the alkyl radical and up to about 10 percent, preferably up to about 7.0 percent, by weight of the alkyl acrylate having from 1 to 8 carbon atoms in the alkyl radical. Examples of such acrylates include ethyl acrylate, propyl acrylate, and butyl acrylate. The rigid methyl methacrylate component preferably has a weight average molecular weight of at least about 60,000 and up to about 300,000 as measured by light scattering in chloroform.

The styrene-acrylonitrile polymer component of the polymeric materials of the invention is preferably a copolymer of at least about 78 and up to about 88 percent by weight of styrene; and at least about 12 and up to about 22 percent by weight of acrylonitrile. The styrene-acrylonitrile polymer component preferably has a weight average molecular weight of at least about 60,000 and up to about 300,000, as determined by light scattering in dimethylformamide.

The grafted rubber component is formed from a rubber having a glass transition temperature of up to about −20° C. The grafted rubber may be at least about 50 and may be up to about 80 percent by weight of a diene rubber, the balance of the weight of the grafted rubber being the grafted monomers. Preferably, the grafted monomers consist of at least about 40 percent by weight and up to 100 percent by weight of one or more methacrylic esters of $C_1$ to $C_8$ alkanols, with the balance being selected from styrene, alkyl styrenes having up to 12 carbon atoms, and mixtures thereof. In a preferred embodiment, the rubber is a copolymer of a monomer selected from butadiene, isoprene, and mixtures thereof with styrene or a styrene with up to 12 carbon atoms, preferably one carbon atom, substituted in the alpha position [hereinafter called "alkylstyrene"].

Preferably, the rubber is the reaction product of at least about 60 percent, and up to about 90 percent, of butadiene, isoprene, or mixtures thereof, the balance being the styrene or alkylstyrene monomers. It is particularly preferred that the rubber be the reaction product of at least about 60 percent butadiene and up to about 90 percent of butadiene, the balance being the styrene.

The rubber is grafted with one or more methacrylic acid esters of $C_1$ to $C_8$ alkanols and, optionally, styrene or an alkylstyrene having up to 12 carbon atoms. A small amount of acrylate monomer, such as methyl, ethyl, propyl, or butyl acrylate, may be added to the methacrylic ester monomer portion. The rubber comprises at least about 50 weight percent, preferably at least about 55 weight percent of the graft polymer and up to about 80 weight percent, preferably up to about 70, weight percent of the graft polymer. The balance of weight of the graft polymer comes from the grafting monomers. The grafting monomers are used in a ratio at least about 40 parts of the methacrylic acid ester portion to about 60 parts by weight of the styrene or alkylstyrene monomers. The rubber may also be ungrafted. The grafting monomers may be reacted sequentially or as a mixture. The rubber may be produced by emulsion polymerization, in which case, following grafting, the grafted rubber may be spray dried prior to preparing the polymeric material of the inventive compositions. The particle size of the grafted rubber should then be 0.2 microns or less.

The polymeric materials or resins of the invention have at least about 15 parts by weight, preferably at least about parts by weight, of the methyl methacrylate homopolymer or copolymer and up to about 70 parts by weight, preferably up to about 60 parts by weight, of the methyl methacrylate homopolymer or copolymer; at least about 10 parts by weight of the styrene-acrylonitrile polymer and up to about 50 parts by weight, preferably up to about 40 parts by weight, of the styrene-acrylonitrile polymer; and at least about 20 parts by weight, preferably at least about 25 parts by weight, of the grafted rubber, preferably of styrene butadiene rubber grafted with methyl methacrylate, and up to about 50 parts by weight, preferably up to about 40 parts by weight, of the grafted rubber, again preferably of styrene butadiene rubber grafted with methyl methacrylate. Customary additives may be added in amounts of up to 20%, based upon the weight of the resin. Examples of useful additives include styrene/maleic anhydride copolymers, dyes, stabilizers, lubricants, and antistatic agents.

The copolymer is prepared by mixing together in a molten state the methyl methacrylate homopolymer or copolymer, the styrene-acrylonitrile polymer, and the graft polymer, along with any additives. The components are usually mixed together at temperatures between 200° C. and 300° C. The components may also be mixed together as solutions or suspensions, preferably in a solvent desirable for formulating the cement.

It is particularly preferred that the copolymer be a methyl methacrylate-acrylonitrile-butadiene-styrene material (MABS). MABS materials are available commercially, for example under the tradename Terlux® from BASF Corp., Mount Olive, N.J.

Because the MABS polymeric material is more soluble in the solvents typically used in cements for PVC pipe, the concentration of the copolymer in the cement can be higher than the concentration of PVC in conventional cements. The MABS material is preferably included at a level of at least weight percent, more preferably at least about 20 weight percent. Also preferably, the MABS material is up to about 60 weight percent of the cements of the present invention, more preferably up to about 40 weight percent of the cement.

Many solvents or solvent mixtures may be useful in the cements, sealants, and adhesives of the invention. The solvent or solvent mixture chosen must be liquid, volatile, and capable of solvating or dispersing the components of the cement, adhesive, or sealant. The solvent or solvent mixture also desirably participates in the bonding process by solvating or softening the thermoplastic materials to be joined. Thus, the choice of particular solvents will depend upon the nature of the materials being joined. The types and amounts of solvents used are preferably chosen so that the cement compositions will meet or exceed the standards for bond strength set out in ASTM D 2564-88, "Standard Specification for Solvent Cements for Poly(Vinyl Chloride) (PVC) Plastic Pipe and Fittings," incorporated herein by reference.

Examples of useful preferred solvents include lower alcohols such as methanol, ethanol, and isopropanol; ketones such as acetone, methyl ethyl ketone, methyl propyl ketone, methyl isobutyl ketone, methyl isoamyl ketone, isophorone, and cyclohexanone; esters such as methyl acetate, ethyl acetate, ethyl formate, ethyl propionate, butyl acetate, propyl propionate, gamma-butyrolactone, and epsilon-caprolactone; halogenated solvents such as dichloromethane, dichloroethane, carbon tetrachloride, chloroform, trichloroethane and dimethylformamide; ethers such as propylene glycol monomethyl ether and dioxane; other liquids such as tetrahydrofuran and N-methyl pyrrolidone; and mixtures of these.

When the materials to be joined will be in contact with potable water, it is preferred to employ solvents for which maximum allowable levels have been established by the National Sanitation Foundation (NSF) for use in potable water plumbing. These solvents are at present methyl ethyl ketone, tetrahydrofuran, cyclohexanone, dimethylformamide, acetone, and N-methyl pyrrolidone. The MABS polymer has excellent solubility in the solvents approved by the NSF for potable water pipe systems. It is especially advantageous to use up to 50 weight percent N-methyl pyrrolidone in the cement compositions. N-methyl pyrrolidone has a low vapor pressure, which results in good storage characteristics. The faster evaporating solvents such as methyl ethyl ketone, tetrahydrofuran, and acetone tend to evaporate from the cement over time, leading to increased viscosity. In addition, N-methyl pyrrolidone is an excellent solvent for PVC and has low toxicity.

The compositions of the invention contain at least about 10 weight percent, preferably at least about 50 weight percent, and particularly preferably at least about 60 weight percent solvent or a blend of solvents. The compositions of the invention also contain up to about 90 weight percent, preferably up to about 80 weight percent solvent or a blend of solvents. In one preferred embodiment, at least about 10 weight percent and up to about 50 weight percent N-methyl pyrrolidone is used in making a cement. It is preferred not to use more than 50 weight percent N-methyl pyrrolidone because the slow evaporation of N-methyl pyrrolidone would mean that joints formed with compositions containing more than about 50% N-methyl pyrrolidone would take longer to develop ultimate properties such as lap shear strength. In order to develop lap shear strength and hydrostatic burst strength more quickly, the cement may include a faster evaporating solvent, such as methyl ethyl ketone, that volatilizes quickly to allow the cement to harden (cure).

When other solvents are used instead of or in addition to N-methyl pyrrolidone, preferably the solvents are at least about 35 weight percent and preferably up to about 80 weight percent methyl ethyl ketone; preferbly at least about 2 weight percent and preferably up to about 50 weight percent tetrahydrofuran; preferably at least about 2 weight percent and preferably up to about 10 weight percent cyclohexanone; preferably at least about 2 weight percent and up to about 10 weight percent dimethylformamide; or preferably at least about 2 weight percent and up to about 50 weight percent acetone.

The pipe cement, sealant, or adhesive may be prepared by any of a number of means. While the polymeric materials may be first dissolved in the solvent or solvent mixture, followed by addition of any further materials or additives, other methods of preparation are contemplated and within the scope of the invention.

Pipe cements, including the pipe cements of the present invention, are usually formulated to have one of three standard viscosities that are used in the industry. According to ASTM D 2564-88 guidelines, a regular-bodied cement has a minimum viscosity of about 90 centipoise (cP); a medium-bodied cement has a minimum viscosity of about 500 cP; and a heavy-bodied cement has a minimum viscosity of about 1600 cP. All viscosities are measured at about 23° C. Usually the heavier-viscosity cement grades are used for pipes having larger diameters or for non-interference fits. For example, ASTM D 2564-88 specifies that the minimum viscosity that should be used on eight- to twelve-inch pipe is 1600 cP and the minimum viscosity that should be used on 2.5- to six-inch pipe is 500 cP for interference fits and 1600 cP for non-interference fits. The higher viscosity cements form thicker films and deposit more gap-filling resin.

It will be appreciated that the cement, sealant, and adhesive compositions of the invention can contain optional ingredients, including those well-known in the art, such as fillers, pigments, dyes, colorants, viscosity-modifying agents, stabilizers, and so forth. Such materials are readily available commercially, and the levels and methods of incorporation are well-known to the skilled artisan. Examples of useful additives include heat stabilizers such as organometallic compounds including alkyltin and dialkyltin compounds; plasticizers such as phthalate esters; pigments, other colorants, fillers, and viscosity-modifying agents such as colloidal silica, amorphous silica, silica flour, ground quartz, carbon black, titanium dioxide, barium sulfate, iron oxides, talc, barytes, fumed silica, treated bentonite clay, calcium carbonate, clays, magnesium silicate, magnesium oxide, micas, and hollow, silica-alumina alloy ceramic fillers such as Zeelan Z-Light spheres.

Pipe cements are usually applied by a process that includes application of a primer followed within about five minutes, preferably within about one minute, and particularly preferably in about thirty seconds to about one minute, by application of the cement. The primer is used to help soften one or both of the pieces to be joined.

Usually, the primer is a blend of the same solvents that are in the cement. The primer also usually includes one or more pigments or colorants. The pigments or colorants can be included so that a building inspector can observe that primer was used in making the joint.

The cement is applied by brushing the cement onto one or, preferably, both of the surfaces to be joined and then bringing the two pieces to be joined together. The cement, like the primer, softens the contacting surfaces of the joined pieces. The cement may be applied in one or more coats. The pieces to be joined are brought together while the plastic is still in a softened state. Usually, the pieces are joined immediately after the final coat of cement is applied, or at least within about one minute, and preferably within about twenty seconds. Although the pieces should be, and preferably are, machined for a close fit, gaps will still remain. The purpose of the resin in the cement is to fill the gaps in order to form a strong and durable bond between the joined pieces. Thus, sufficient cement must be applied to fill any gap between the joined pieces.

When joints with PVC pipe and fittings are formed, the preferred procedure is that of ASTM D 2855-90, "Standard Practice for Making Solvent-Cemented Joints with Poly (Vinyl Chloride) (PVC) Pipe and Fittings," which is incorporated herein by reference. The assembled joint is allowed to set for the time recommended by the ASTM method before installation. The assembled joint is allowed to fully cure (harden) before being put into use. During set and cure, the solvent evaporates and the thermoplastic materials harden. The times required for set and cure depend upon ambient conditions and are within the experience of the person of ordinary skill in the art. The setting or curing of the joint results from the solvents evaporating. The solvated resins of the surfaces and the resin in the cement dry through the solvent evaporation and form a continuous, tight joint.

The invention is illustrated by the following example. The example is merely illustrative and does not in any way limit the scope of the invention as described and claimed. All parts and percentages are by weight unless otherwise noted.

EXAMPLES

Example 1

Cement Containing 25 Weight Percent MABS
The cement was prepared by mixing together:

| | |
|---|---|
| methyl ethyl ketone | 52.5 wt. % |
| N-methyl pyrrolidone | 15 wt. % |
| tetrahydrofuran | 3.75 wt. % |
| cyclohexanone | 3.75 wt. % |
| MABS[1] | 25 wt. % |

[1]The MABS used was Terlux ® 2808, available from BASF Corp., Mount Olive, NJ.

The properties and performance of the Example 1 cement were tested according to the following tests and with the following results:
(1) Hydrostatic Burst Strength, ASTM D 2564-88 test method:
   Minimum acceptable hydrostatic burst strength 400 psi at 2 hours cure time
   Hydrostatic burst strength of Example 1 was measured as 940 psi at 17 hours cure time.
(2) Lap Shear Strength, ASTM D 2564-88 test method:
   The lap shear strength was measured at 424.4 psi at 48 hours cure time.
(3) VOC content according the South Coast Air Quality Management District (SCAQMD) Test No. 316A-92
   The VOC of Example 1 was measured as 350 g/L
(4) Viscosity of Example 1: 100 cP.

The invention has been described in detail with reference to preferred embodiments thereof. It should be understood, however, that variations and modifications can be made within the spirit and scope of the invention and of the following claims.

I claim:
1. A PVC pipe cement composition, comprising:
   (a) at least about 10% by weight of a polymeric material of a methyl methacrylate homopolymer or copolymer, a styrene-acrylonitrile polymer, and a rubber grafted with at least a methacrylic acid ester of a $C_1$ to $C_8$ alkanol; and
   (b) at least about 10% by weight organic solvent.

2. A cement composition according to claim 1, comprising at least one solvent selected from the group consisting of methyl ethyl ketone, tetrahydrofuran, cyclohexanone, dimethylformamide, acetone, N-methyl pyrrolidone and mixtures thereof.

3. A cement composition according to claim 1, wherein the solvent comprises N-methyl pyrrolidone.

4. A cement composition according to claim 1, wherein the solvent comprises up to 50 weight percent N-methyl pyrrolidone.

5. A cement composition according to claim 1, wherein the rubber is a copolymer of a monomer selected from the group consisting of butadiene, isoprene, and mixtures thereof, with styrene or alkylstyrene, the alkyl group having up to 12 carbon atoms.

6. A cement composition according to claim 1, wherein the rubber is a reaction product of from about 60 to about 90 percent of a monomer selected from the group consisting of butadiene, isoprene, and mixtures thereof, with from about 10 to about 40 percent styrene or alkylstyrene, the alkyl group having up to 12 carbon atoms.

7. A cement composition according to claim 1, wherein the rubber is a styrene-butadiene rubber.

8. A cement composition according to claim 1, wherein the rubber is a styrene-butadiene rubber and further wherein the rubber is grafted with at least methyl methacrylate.

9. A cement composition according to claim 1, wherein the polymeric material comprises
   (a) from about 15 to about 70 parts by weight of a methyl methacrylate polymer having from about 90 to 100 percent by weight methyl methacrylate and the balance being an alkyl acrylate having 1 to 8 carbons in the alkyl radical;
   (b) from about 10 to about 50 parts by weight of a styrene acrylonitrile copolymer having from about 78 to about 88 percent by weight styrene and the balance being acrylonitrile; and
   (c) from about 20 to about 50 parts by weight of a grafted rubber that is from about 50 to about 80 percent of a diene rubber and the balance being grafted monomers, wherein the grafted monomers consist of from about 40 to 100 percent by weight of one or more methacrylic esters of $C_1$ to $C_8$ alkanols and the balance being selected from styrene, alkyl styrenes having up to 12 carbon atoms, and mixtures thereof.

* * * * *